United States Patent [19]
Lester et al.

[11] Patent Number: 6,115,604
[45] Date of Patent: Sep. 5, 2000

[54] METHOD AND APPARATUS FOR CONNECTING WIRELESS TRANSMISSIONS TO ANALOG PHONE LINES

[75] Inventors: Leland Lester; David Iglehart; Elie Antoun Jreij, all of Austin, Tex.; William Joseph Beyda, Cupertino, Calif.

[73] Assignee: Siemens Information and Communication Networks, Inc., Boca Raton, Fla.

[21] Appl. No.: 09/021,643

[22] Filed: Feb. 10, 1998

[51] Int. Cl.[7] .............................. H04Q 7/22; H04Q 7/32; H04M 1/66
[52] U.S. Cl. ...................... 455/422; 455/422; 455/445; 455/557; 455/560; 455/573; 455/553; 379/58; 379/59; 379/61; 379/210; 379/211; 379/212
[58] Field of Search .................................. 455/422, 445, 455/553, 557, 573, 560; 379/210–212

[56] References Cited

U.S. PATENT DOCUMENTS

| | | |
|---|---|---|
| 4,005,269 | 1/1977 | Willis ........................................ 179/2 C |
| 4,737,975 | 4/1988 | Shafer ........................................ 379/58 |
| 5,469,494 | 11/1995 | Perez et al. ............................... 375/27 |
| 5,528,667 | 6/1996 | Steffensen et al. ...................... 379/58 |
| 5,588,041 | 12/1996 | Meyer, Jr. et al. ....................... 379/59 |
| 5,751,789 | 5/1998 | Farris et al. .............................. 379/34 |
| 5,790,631 | 8/1998 | Minarczik et al. ....................... 379/2 |
| 5,848,353 | 12/1998 | Matsumoto ............................ 455/11.1 |
| 5,903,833 | 5/1999 | Jonsson et al. ......................... 455/417 |

*Primary Examiner*—David R. Hudspeth
*Assistant Examiner*—Meless Zewdu

[57] ABSTRACT

An apparatus and method for using local wiring (102) with a wireless phone (114) are described. The local wiring is coupled to a local phone network (110). Where the local wiring is not engaged with a current call, transmission of calls from the local phone network to the local wiring is inhibited (112, 218) in response to receipt of a wireless transmission by the wireless phone. A ring signal is transmitted (216) to another device (104, 106) coupled to the local wiring. The wireless transmission is converted (214) for transmission over the local wiring. In response to the other device responding to the ring signal, the converted wireless transmission is transmitted (216) to the other device over the local wiring.

26 Claims, 4 Drawing Sheets

METHOD AND APPARATUS FOR CONNECTING WIRELESS TRANSMISSIONS TO ANALOG PHONE LINES

BACKGROUND OF THE INVENTION

The present invention relates to wireless phone technology. More specifically, the invention relates to methods and apparatus for connecting incoming wireless phone calls to analog phone lines while the wireless phone is recharging in its docking base.

Currently, when the batteries of a cellular phone are recharging the phone loses an important part of its utility, i.e., its portability. In some cases, the charging unit or docking base allows the cellular phone to remain on and to receive incoming transmissions. However, unless the user is in close proximity to the docking base she is not likely to hear the phone ring.

In addition, while some proponents of deregulating the telecommunications industry envision increased competition for providing local telephone service, the lack of available transmission resources in local markets presents a significant barrier to many potential entrants.

It is therefore desirable to provide a method and apparatus by which transmissions received by a cellular phone may be routed to the internal analog phone lines at a user's home or business without conflicting with calls routed from the user's local phone service provider. With such technology the user could receive cellular calls on his home phone. The user could, in fact, forego subscribing to the local phone company and use the cellular phone and network for local service, thus having a more simple, integrated phone service. The other side of the equation is, of course, that long distance carriers who have cellular networks could use such technology to enter the local service market without having to install a local hardware infrastructure.

SUMMARY OF THE INVENTION

According to the present invention, a method and apparatus are provided by which calls received by a cellular phone are redirected to the analog phones in, for example, a residence via the analog phone lines installed throughout the residence. According to one embodiment, a cellular phone docking base is provided in which the cellular phone gets its batteries recharged. The docking base is also connected to a conventional phone jack which is, in turn, connected to the building's analog phone wiring. When the cellular phone receives a call and the analog wiring is not engaged in a call from some other source, e.g. the local phone network, the docking base inhibits the transmission of calls from the local phone network and transmits a ring signal on the analog phone wiring to the analog phones connected to the wiring. When the ring signal is answered as when, for example, someone picks up a receiver or an answering machine responds, the docking base detects the resultant drop in voltage on the line and connects the answering device to the incoming call. That is, the docking base begins transmitting the cellular call to the answering analog device via the analog phone line. When, however, the analog wiring is engaged with a call from the local phone network, cellular call transmission from the docking base to the analog wiring is disabled.

The advantages of the present invention are immediately apparent. First, a cellular phone user may continue to receive incoming cellular transmissions when the phone is recharging via the analog phone wiring in her residence or office. In addition, a cellular user may opt to integrate her phone services by subscribing only to a cellular provider for both local and long distance service. This would eliminate some significant barriers to companies vying for a share of the local phone service market.

Thus, according to the invention, an apparatus and method are described for transmitting a wireless transmission received by a wireless phone to a communication device via local wiring. The local wiring is coupled to a local phone network. Where the local wiring is not engaged with a current call, transmission of calls from the local phone network to the local wiring is inhibited in response to receipt of a wireless transmission by the wireless phone. A ring signal is then transmitted to the communication device via the local wiring. The wireless transmission is converted for transmission over the local wiring. In response to the communication device responding to the ring signal, the converted call is transmitted to the communication device over the local wiring.

A further understanding of the nature and advantages of the present invention may be realized by reference to the remaining portions of the specification and the drawings.

DESCRIPTION OF SPECIFIC EMBODIMENTS

Figure 1:
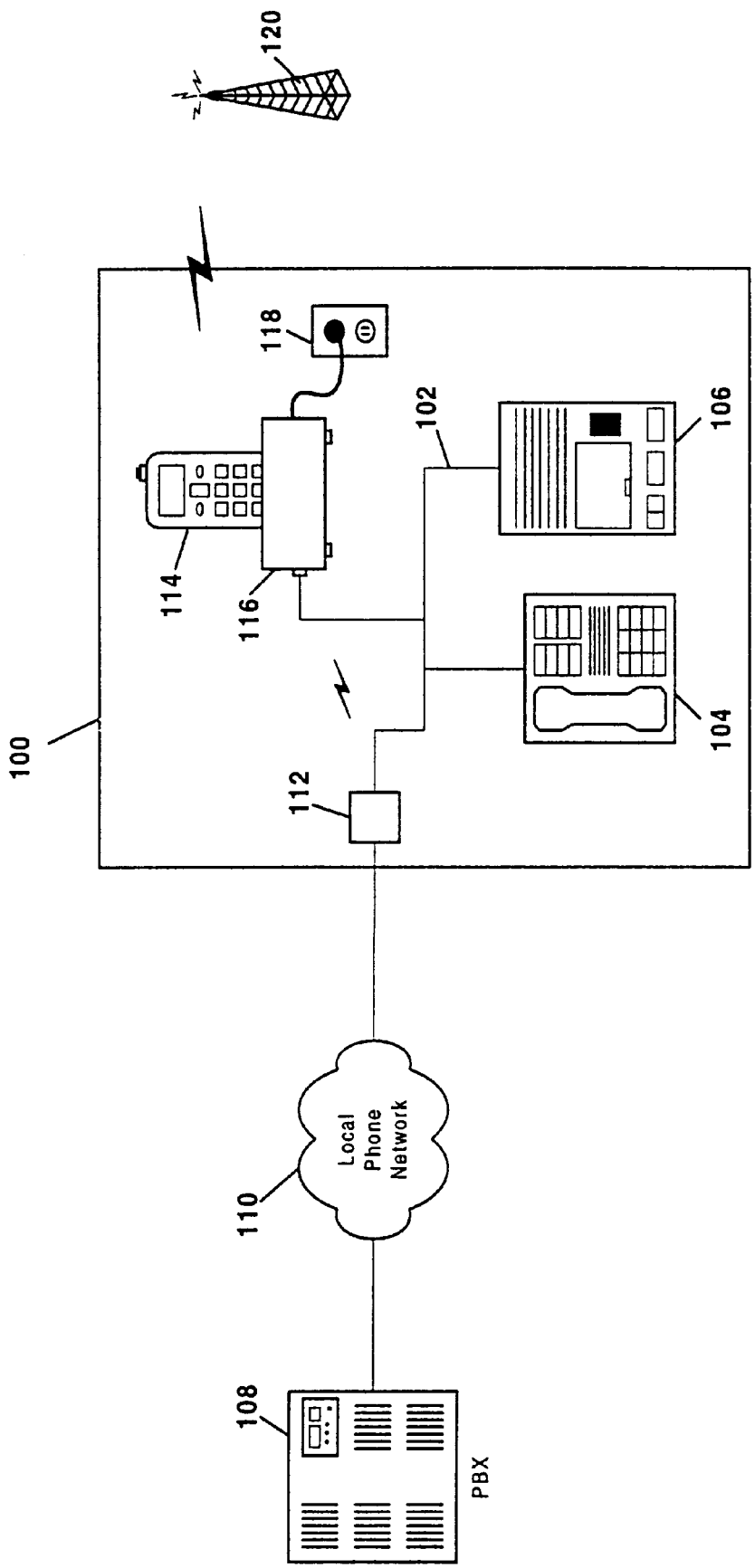
FIG. 1 is a block diagram of a first embodiment of an apparatus for transmitting a wireless phone call to one or more devices on a building's internal wiring.

FIG. 1 is a block diagram of a first embodiment of an apparatus for transmitting a wireless phone call to one or more devices on a building's internal wiring. Residence 100 has internal wiring 102 for transmission of analog and digital information to, for example, telephone 104 and answering machine 106. Local phone service is provided to residence 100 by a central phone office (not shown) represented by public branch exchange (PBX) 108 via local phone network 110. A radio controlled relay 112 is placed in series with the point at which network 110 interfaces with residence 100. As will be understood, the relay 112 could be located inside the residence (as shown) or outside the residence in, for example, a garage. The exact location of relay 112 is irrelevant. What is important is that relay 112 be positioned to be able to control the flow of information between network 110 and internal wiring 102.

Wireless phone 114 is inserted into charging unit 116 for recharging of its batteries (not shown). Wireless phone 114 could be any of a wide variety of wireless communication devices such as, for example, a cellular phone. Power for all of its circuitry is provided to charging unit 116 via a standard 110 VAC/60 Hz outlet 118. Charging unit 116 is also connected to internal wiring 102 via a standard phone jack (not shown) using, for example, a length of RJ-11 transmission line. If a cellular phone 114 receives an incoming call from cell antenna 120, and there is currently no transmission ongoing from network 110, charging unit 116 causes relay 112 to open, converts the incoming call for transmission on internal wiring 102, and sends out a ring signal to the other devices on internal wiring 102, i.e., telephone 104 and answering machine 106. When one of the other devices responds to the ring signal, charging unit 116 then transmits the converted cellular call to the responding device.

As will be discussed below with reference to FIG. 2, if, when cellular phone 114 receives the incoming call internal wiring 102 is engaged in a transmission, charging unit 116 is inhibited from transmitting the cellular call to internal wiring 102. In this way, internal wiring 102 may be shared between the cellular network and the local phone network without conflicts occurring.

Figure 2:
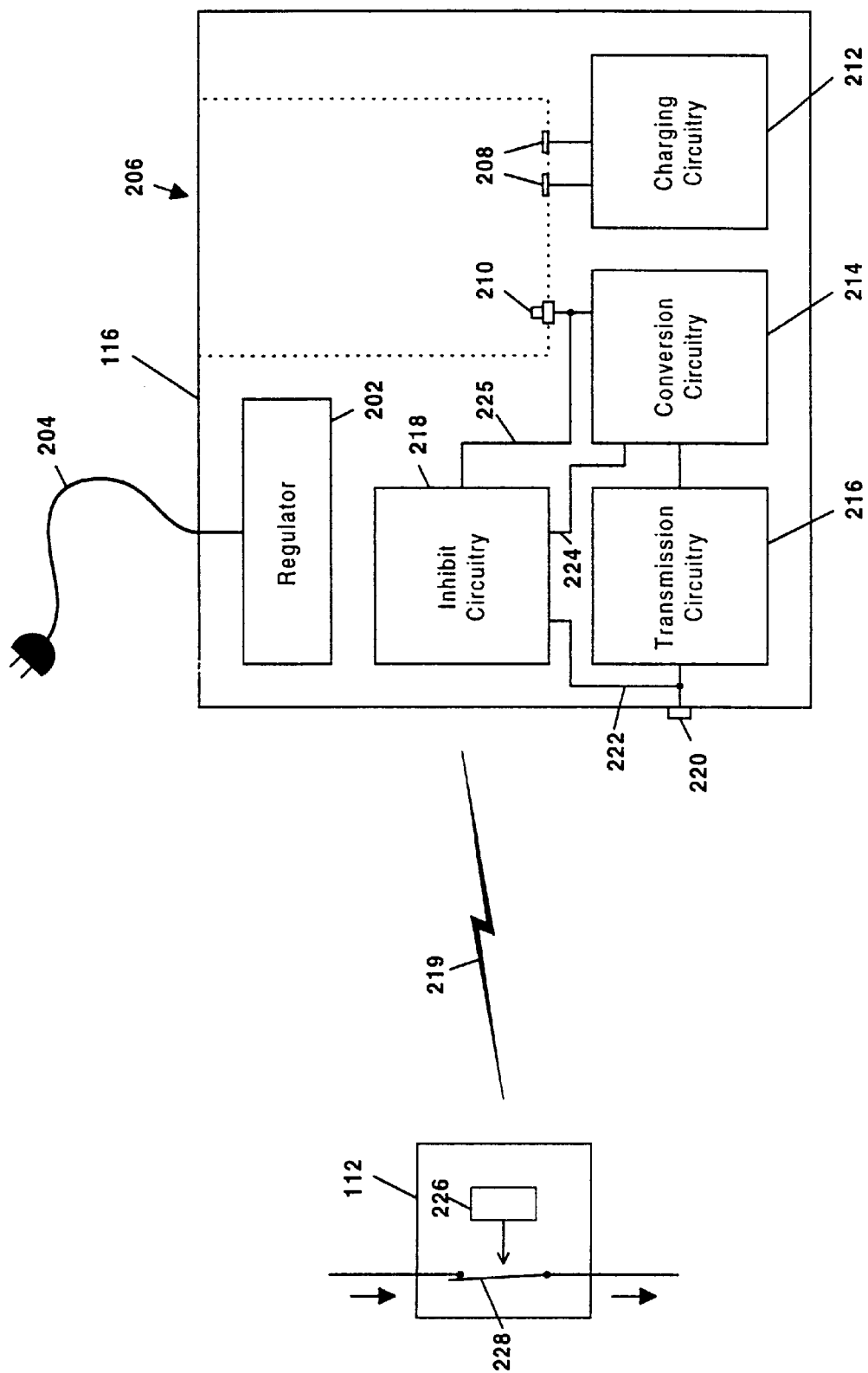
FIG. 2 is a block diagram of the charging unit and relay of FIG. 1.

FIG. 2 is a more detailed block diagram of charging unit 116 and relay 112 of FIG. 1. Regulator 202 converts the 110 VAC received through power cord 204 to regulated DC power which is then provided to all of the circuitry in charging unit 116. Cellular phone 114 (not shown) fits into cavity 206 where it connects with battery charging contacts 208 and line out connector 210. Charging circuitry 212, which charges the batteries of cellular phone 114, is coupled to charging contacts 208 and may be, for example, any of a wide variety of commercially available battery charging circuits. Line out connector 210 provides a path by which a cellular call received by cellular phone 114 may be transmitted to conversion circuitry 214. Conversion circuitry 214 receives the incoming cellular transmission and converts it into a format which may then be transmitted by transmission circuitry 216 over internal wiring 102. For example, a received cellular call which is a voice transmission would be converted to an analog voice format which may then be received and translated by an analog telephone. It will be understood that cellular calls come in a variety of digital and analog formats and that therefore the nature of conversion circuitry 214 depends on the type of cellular phone with which the present invention is intended to be used. It will also be understood that many solutions to the problem of signal conversion are within the skill of one familiar with communications technology.

Before transmitting a converted cellular call, transmission circuitry 216 sends a ring signal out on the internal wiring. When another device attached to the internal wiring, e.g., phone 104, responds to the ring as indicated by a drop in voltage on the line, transmission circuitry 216 sends the converted cellular call to the responding device.

In order to avoid transmission conflicts on the internal wiring, however, one of the functions of inhibit circuitry 218 to determine whether the internal wiring is currently transmitting another call before a cellular call is converted and transmitted as described above. This is achieved by monitoring internal wiring 102 via phone jack 220 and signal line 222. If a transmission is in progress, inhibit circuitry 218 disables conversion circuitry via signal line 224. As a result, charging unit 116 does not respond to any incoming cellular transmissions until the current transmission is terminated.

When the internal wiring is free and inhibit circuitry 218 senses an incoming cellular call via signal line 225, a transmitter in circuitry 218 sends an electromagnetic signal 219, e.g., a radio signal, to remote relay 112. Signal 219 may also be sent as a high frequency signal over the telephone line itself which is then filtered out of the system before it reaches local phone network 110. Similarly, if residence 100 is equipped with more than one phone line, a second unused phone line may be used to transmit signal 219 to relay 112. Another technique for transmitting actuating signal 219 to relay 112 is the power line carrier technique in which a control signal is sent over the 110 VAC power line. An example of such a system is the X-10 system. Thus, it is apparent that there are a wide variety of techniques for transmitting an actuating signal from charging unit 116 to relay 112, all of which are within the scope of the invention.

Upon receipt of the signal, relay control circuit 226 causes relay 228 to open, thereby isolating the internal wiring from the local phone network. The cellular transmission is then placed on the internal wiring. When the cellular transmission ends, inhibit circuitry 218 sends another signal to relay control circuit 226 causing relay 228 to close, and thereby allowing the internal wiring to receive phone service from the local phone network as usual.

As will be understood by one of skill in the art, each of the functionalities described above may be implemented in a wide variety of ways and still remain within the scope of the present invention. One example of conversion and transmission circuitry which may be employed with the present invention is described in U.S. Pat. No. 4,737,975 for PROGRAMMABLE SYSTEM FOR INTERFACING A STANDARD TELEPHONE WITH A RADIO TRANSCEIVER issued on Apr. 12, 1988, the entire specification of which is incorporated herein by reference. In addition, an example of a line out connector for direct connection between a cellular phone and an external device, e.g., the conversion circuitry of the present invention, is described in U.S. Pat. No. 5,588,041 for CELLULAR SPEAKERPHONE AND METHOD OF OPERATION THEREOF issued on Dec. 24, 1996, the entire specification of which is incorporated herein by reference.

Figure 3:
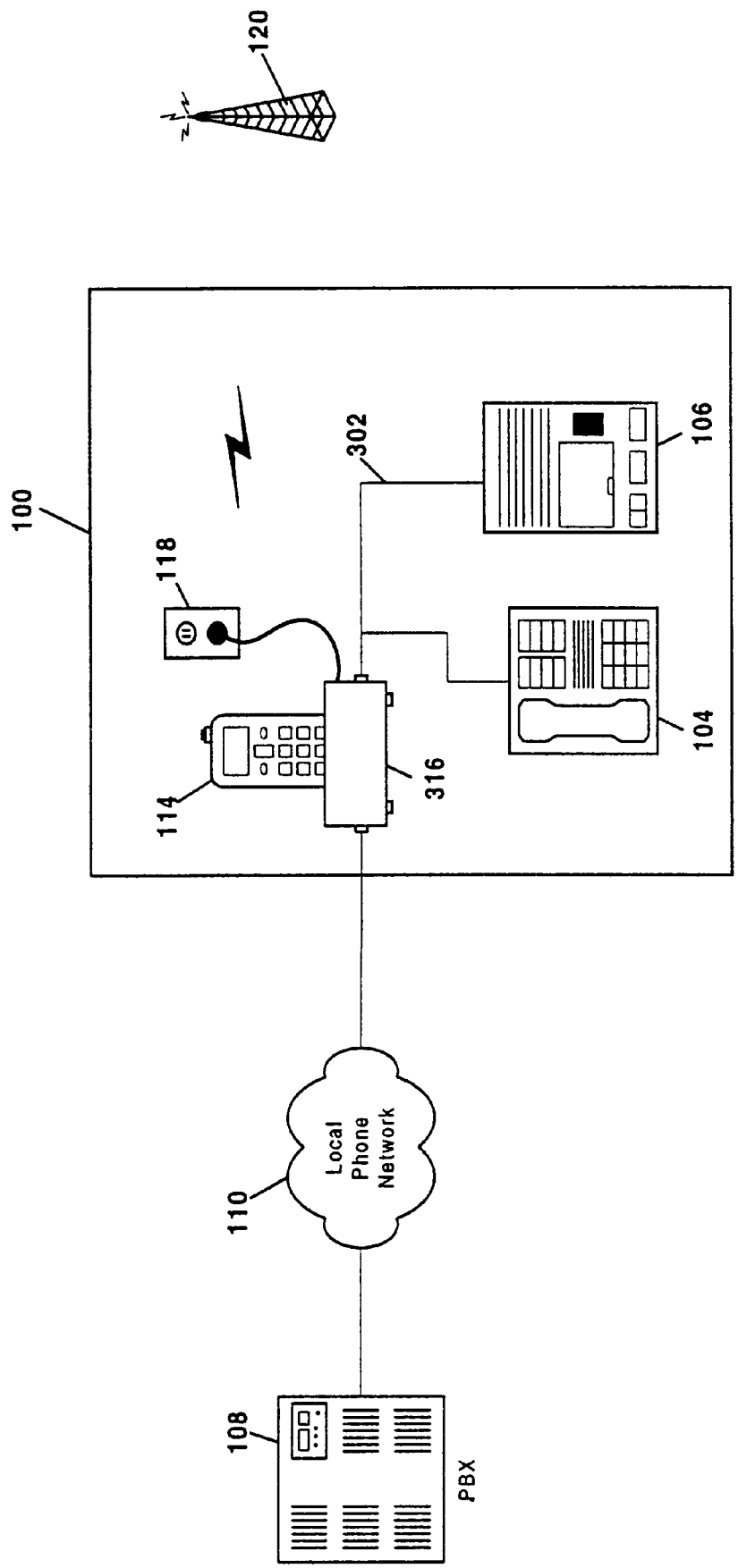
FIG. 3 is a block diagram of a second embodiment of an apparatus for transmitting a wireless phone call to one or more devices on a building's internal wiring.

FIG. 3 is a block diagram of a second embodiment of an apparatus for transmitting a cellular phone call to one or more devices on a building's internal wiring. Reference designations in FIGS. 3 and 4 which are the same as those in FIGS. 1 and 2 indicate equivalent structures or circuits. According to this embodiment, charging unit 316 is placed in such a way that it provides the interface between local phone network 110 and internal wiring 302. Operation of charging unit 316 is similar to that of charging unit 116 in that cellular calls received by cellular phone 114 are transmitted to a responding device, i.e., telephone 104 or answering machine 106, via internal wiring 302 unless internal wiring 302 is currently transmitting another call. Moreover, during transmission of a cellular call, internal wiring 302 is isolated from local phone network 110. A specific implementation of charging unit 316 is described below with reference to FIG. 4.

Figure 4:
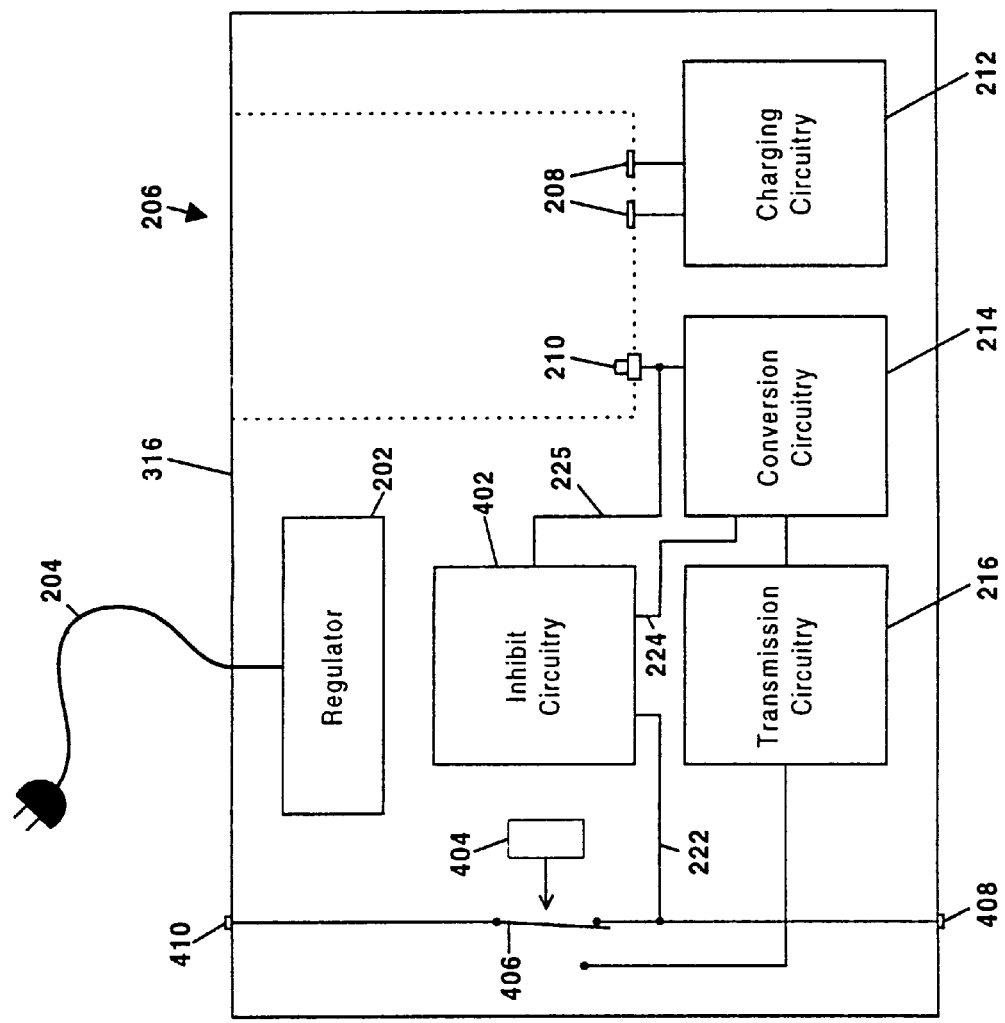
FIG. 4 is a block diagram of the charging unit of FIG. 3.

FIG. 4 is a more detailed block diagram of charging unit 316 of FIG. 3. Regulator 202, charging circuitry 212, conversion circuitry 214, and transmission circuitry 216 operate as described above with regard to FIG. 2. Inhibit circuitry 402 operates similarly to inhibit circuitry 218 except that, in this embodiment, inhibit circuitry 402 is directly connected to relay control circuit 404 which controls relay 406, both of which are included in charging unit 316. Thus, the control signals from inhibit circuitry 402 to relay control circuit 404 do not need to be transmitted through the air. Relay 406 is a single-pole, double-throw switch which switches the output 408 of charging unit 316 between the output of transmission circuitry 216 (i.e., for transmissions from cellular phone 114) and input 410 (i.e., for transmissions from local phone network 110). Transmission of cellular calls onto internal wiring 302 is inhibited using signal lines 222 and 224 as described above with reference to FIG. 2. Alternatively, transmission of cellular calls onto internal wiring 302 may be inhibited simply by disconnecting the output of transmission circuitry 216 from output 408 using relay 406 as shown.

While the invention has been particularly shown and described with reference to specific embodiments thereof, it will be understood by those skilled in the art that changes in the form and details of the disclosed embodiments may be made without departing from the spirit or scope of the invention. For example, the above-described embodiments have been described with reference to charging units. However, the interface between the cellular phone and the internal wiring could easily be implemented separately from a charging unit provided by the manufacturer of the cellular phone. That is, recharging circuitry need not be an integral part of such an interface device to remain within the scope of the invention. Also, the present invention may be employed with any type of wireless phone. For example, any of the new digital PCS phones may be connected to local phone wiring through the use of the present technique. The same is true for wireless satellite based systems. Therefore, the scope of the invention should be determined with reference to the appended claims.

What is claimed is:

1. A method for transmitting a wireless transmission received by a wireless phone to a communication device via local wiring, the local wiring being coupled to a local phone network, the method comprising:

where the local wiring is not engaged with a current call, inhibiting transmission of calls from the local phone network to the local wiring in response to receipt of the wireless transmission by the wireless phone;

transmitting a ring signal to the communication device via the local wiring;

converting the wireless transmission to a converted call for transmission over the local wiring; and in response to the communication device responding to the ring signal, transmitting the converted call to the communication device over the local wiring.

2. The method of claim 1 further comprising the step of inhibiting transmission of the wireless transmission on the local wiring where the local wiring is engaged with the current call.

3. The method of claim 1 wherein inhibiting transmission comprises actuating a relay thereby isolating the local wiring from the local phone network.

4. The method of claim 3 wherein actuating the relay comprises transmitting an actuating signal via the air from a remote location.

5. The method of claim 3 wherein actuating the relay comprises transmitting an actuating signal from inhibiting circuitry connected to the relay.

6. The method of claim 3 wherein actuating the relay enables transmission of the ring signal and the converted call on the local wiring.

7. The method of claim 3 further comprising actuating the relay thereby enabling transmission of calls from the local phone network to the local wiring in response to termination of the wireless transmission.

8. The method of claim 1 further comprising enabling transmission of calls from the local phone network to the local wiring in response to termination of the wireless transmission.

9. The method of claim 1 wherein the communication device is an analog device, converting the wireless transmission comprising converting the wireless transmission to a format which may be processed by the analog device.

10. The method of claim 9 wherein the wireless transmission is in a digital format.

11. The method of claim 9 wherein the wireless transmission is in an analog format.

12. The method of claim 1 further comprising charging batteries in the wireless phone while transmitting the wireless transmission via the local wiring.

13. An apparatus for transmitting a wireless transmission received by a wireless phone to a communication device via local wiring, the local wiring being coupled to a local phone network, the apparatus comprising:

conversion circuitry for coupling to the wireless phone and for converting the wireless transmission to a converted call for transmission over the local wiring;

first inhibiting circuitry for coupling to the wireless phone and the local wiring and for inhibiting transmission of calls from the local phone network to the local wiring in response to receipt of the wireless transmission by the wireless phone; and transmission circuitry for coupling to the conversion circuitry and the local wiring, for transmitting a ring signal and the converted call to the communication device over the local wiring.

14. The apparatus of claim 13 further comprising second inhibiting circuitry coupled to the local wiring and the transmission circuitry for inhibiting transmission of the converted call over the local wiring where the local wiring is engaged with a current call.

15. The apparatus of claim 13 wherein the first inhibiting circuitry is operable to enable transmission of calls from the local phone network to the local wiring in response to termination of the wireless transmission.

16. The apparatus of claim 13 wherein the first inhibiting circuitry comprises a relay which upon actuation isolates the local wiring from the local phone network.

17. The apparatus of claim 16 wherein the relay is remotely located and receives an actuating signal from another portion of the first inhibiting circuitry via the air.

18. The apparatus of claim 16 wherein the relay is remotely located and receives an actuating signal from another portion of the first inhibiting circuitry via a power line.

19. The apparatus of claim 16 wherein the relay is remotely located and receives an actuating signal from another portion of the first inhibiting circuitry via a second phone line.

20. The apparatus of claim 16 wherein the relay has a first position and a second position, the first position connecting the local phone network to the local wiring and the second position connecting the transmission circuitry to the local wiring.

21. The apparatus of claim 13 wherein the conversion circuitry is operable to convert digital wireless transmissions for transmission over the local wiring.

22. The apparatus of claim 13 wherein the conversion circuitry is operable to convert analog wireless transmissions for transmission over the local wiring.

23. The apparatus of claim 13 wherein the wireless phone comprises a cellular phone and the conversion circuitry is operable to convert cellular transmissions for transmission over the local wiring.

24. The apparatus of claim 13 wherein the wireless phone comprises a digital personal communication device and the conversion circuitry is operable to convert digital transmissions for transmission over the local wiring.

25. The apparatus of claim 13 wherein the wireless phone comprises a satellite system phone and the conversion circuitry is operable to convert satellite transmissions for transmission over the local wiring.

26. The apparatus of claim 13 further comprising charging circuitry for charging batteries in the wireless phone.

* * * * *